United States Patent
Robison, Jr. et al.

(10) Patent No.: US 9,332,007 B2
(45) Date of Patent: May 3, 2016

(54) METHOD FOR SECURE, ENTRYLESS LOGIN USING INTERNET CONNECTED DEVICE

(71) Applicant: Dell Products L.P., Round Rock, TX (US)

(72) Inventors: Charles D Robison, Jr., Buford, GA (US); Daniel L Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 205 days.

(21) Appl. No.: 14/012,038

(22) Filed: Aug. 28, 2013

(65) Prior Publication Data

US 2015/0067793 A1    Mar. 5, 2015

(51) Int. Cl.
| | |
|---|---|
| G06F 7/04 | (2006.01) |
| G06F 15/16 | (2006.01) |
| G06F 17/30 | (2006.01) |
| H04L 29/06 | (2006.01) |
| H04W 4/00 | (2009.01) |

(Continued)

(52) U.S. Cl.
CPC .......... *H04L 63/0838* (2013.01); *H04L 63/083* (2013.01); *H04L 63/0853* (2013.01); *G06K 19/073* (2013.01); *G06Q 20/00* (2013.01); *G07F 7/10* (2013.01); *H04K 3/00* (2013.01); *H04L 9/32* (2013.01); *H04L 63/0492* (2013.01); *H04W 4/008* (2013.01)

(58) Field of Classification Search
CPC ............ H04L 63/0838; H04L 63/0853; H04L 63/083; H04L 9/32; H04L 63/0492; G07F 7/10; H04K 3/00; G06Q 20/00; G06K 19/073; H04W 4/008

USPC ....................................... 726/5; 713/182–185
See application file for complete search history.

(56) References Cited

U.S. PATENT DOCUMENTS

| | | | | |
|---|---|---|---|---|
| 8,467,770 B1 * | 6/2013 | Ben Ayed | ............. | H04L 63/107 455/41.1 |
| 8,646,060 B1 * | 2/2014 | Ben Ayed | ........... | H04L 63/0853 726/9 |

(Continued)

OTHER PUBLICATIONS

WIPO Publication—Publication No. WO2010043974 A1, Richard, Pub. Date Apr. 22, 2010.*

(Continued)

*Primary Examiner* — Jayesh Jhaveri
(74) *Attorney, Agent, or Firm* — Terrile, Cannatti, Chambers & Holland, LLP; Stephen A. Terrile

(57) ABSTRACT

A system, method, and computer-readable medium are disclosed for using an entryless One-Time Password (OTP) in an active tag environment. Authentication credentials associated with a user and an active tag device are submitted with an access request to an authentication server, where they are processed to generate an OTP credential, which is then stored in a directory service. Encryption operations are then performed on the OTP credential to generate an encrypted OTP credential, which is then provided to the active tag device, which in turn provides it to an active tag terminal. The active tag terminal then submits a request to the authentication server to verify the validity of the encrypted OTP credential. In response, the authentication server verifies its validity and then destroys the OTP credential stored in the directory service. The OTP credential is then decrypted by the active tag terminal and subsequently used to login the user.

18 Claims, 5 Drawing Sheets

(51) Int. Cl.
*G07F 7/10* (2006.01)
*H04L 9/32* (2006.01)
*H04K 3/00* (2006.01)
*G06Q 20/00* (2012.01)
*G06K 19/073* (2006.01)

(56) References Cited

U.S. PATENT DOCUMENTS

| | | | |
|---|---|---|---|
| 2005/0228981 A1* | 10/2005 | Gavrilov | H04L 63/08 713/100 |
| 2006/0212932 A1* | 9/2006 | Patrick | H04L 63/1441 726/11 |
| 2008/0172713 A1* | 7/2008 | Kamendje et al. | 726/1 |
| 2009/0110200 A1* | 4/2009 | Srinivas | G06F 21/335 380/279 |
| 2010/0085154 A1* | 4/2010 | Park et al. | 340/5.85 |
| 2010/0199086 A1* | 8/2010 | Kuang | H04L 63/0869 713/155 |
| 2010/0229222 A1* | 9/2010 | Li | H04N 7/17318 726/5 |
| 2011/0314515 A1* | 12/2011 | Hernoud | H04W 12/06 726/2 |
| 2011/0321117 A1* | 12/2011 | Nestler | G06F 21/604 726/1 |
| 2013/0074179 A1* | 3/2013 | Das | H04L 63/0838 726/18 |
| 2014/0357187 A1* | 12/2014 | Ehrensvard | H04L 63/0838 455/41.1 |
| 2015/0007280 A1* | 1/2015 | Carlson | H04L 63/0853 726/5 |

OTHER PUBLICATIONS

WIPO Publication—Publication No. WO2010043974 A1, Richard, Pub. Date Apr. 22, 201.*

* cited by examiner

METHOD FOR SECURE, ENTRYLESS LOGIN USING INTERNET CONNECTED DEVICE

BACKGROUND OF THE INVENTION

1. Field of the Invention

The present invention relates to the management of information handling systems. More specifically, embodiments of the invention provide a system, method, and computer-readable medium for using an entryless One-Time Password (OTP) in an active tag environment.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems have made life easier for businesses and individuals by making information readily available. For example, end users access business accounts to transact all sorts of business at all hours of the day. On-line bank accounts provide individuals with access to finances for transferring funds and paying bills from home, from the office or from wireless hotspots located throughout the world. Employees have access to work files through Internet connections to enterprise servers to allow work from home or virtually any location having an Internet connection. In many instances, information sent through the Internet is highly sensitive. Often, a substantial risk exists if such sensitive information gets into the wrong hands. For example, an individual can have unauthorized withdrawals from compromised accounts and enterprises face liability to customers who are injured by illicit use of sensitive information. Generally, access to sensitive information is protected with passwords and encryption, however, passwords sometimes fall into the wrong hands and no encryption method is foolproof.

In order to provide improved security, enterprises are increasingly turning to a multi-factor authentication solution for employee and customer access to sensitive information, such as remote banking, or remote access of any kind One example of multi-factor authentication is the use of a One-Time Password (OTP), in conjunction with a traditional password, to authorize access to sensitive information. OTPs are typically generated by algorithms running on dedicated hardware devices, such as a key fob that generates and displays an OTP valid for a single use. One problem with OTPs is that the use of dedicated hardware devices increases the expense and complexity of implementing an OTP verification system. For example, losing or misplacing a dedicated hardware device means that an end user cannot access information until the device is replaced and the account is reset. One solution for implementing OTP without a dedicated device is to run the OTP algorithm in application embedded in an information handling system. Such embedded systems typically present the OTP through a display or a software interface through an operating system's application layer.

However, communication of the OTP through an operating system or application layer makes the OTP vulnerable to exploitation, such as by hackers who have gained access to an information handling system through a malicious program running on the information handling system. Additionally, OTP tokens are inherently, susceptible to time-of-use and time-of-check attacks due to being independently generated by a common algorithm. Other multi-factor approaches include the implementation of Near Field Communication (NFC) authentication, which has the potential to simplify the user logon experience for end user consumers and users controlled by domains. However, the security of NFC is potentially vulnerable due to its support of smart connected, smart disconnected, and "dumb" NFC cards. Furthermore, current NFC approaches lack support for third party authorities, such as a Public Key Infrastructure (PKI), that can vouch for authenticity and provide revocation when necessary.

SUMMARY OF THE INVENTION

A system, method, and computer-readable medium are disclosed for using an entryless One-Time Password (OTP) in an active tag environment. In various embodiments, the active tag environment includes an active tag device, an active tag terminal, an authentication server, and a directory service. In these embodiments, entryless OTP login operations are initiated by submitting authentication credentials associated with a user and the active tag device, along with an access request, to the authentication server. In turn, the authentication server processes the authentication credentials and access request to generate an OTP credential for the user. The resulting OTP credential is then sent to the directory service.

Encryption operations are then performed on the OTP credential by the authentication server to generate an encrypted OTP credential, which is then provided to the active tag device. In turn, the active tag device provides the encrypted OTP credential to the active tag terminal. In one embodiment, the encrypted OTP credential is provided to the active tag terminal in a Near Field Communication (NFC) Data Exchange Format (NDEF).

The active tag terminal then requests that the authentication server verify the validity of the encrypted OTP credential. In response, the authentication server accesses the directory service and performs verification operations to verify the validity of the encrypted OTP credential. The authentication server then returns the results of the verification operations to the active tag terminal, followed by destroying the OTP credential stored in the directory service. If it was determined that the OTP credential is valid, then the OTP credential is then decrypted and subsequently used to login the user to the active tag terminal. Thereafter, the OTP credential is permanently deleted from the active tag device.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for using an entryless One-Time Password (OTP) in an active tag environment. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
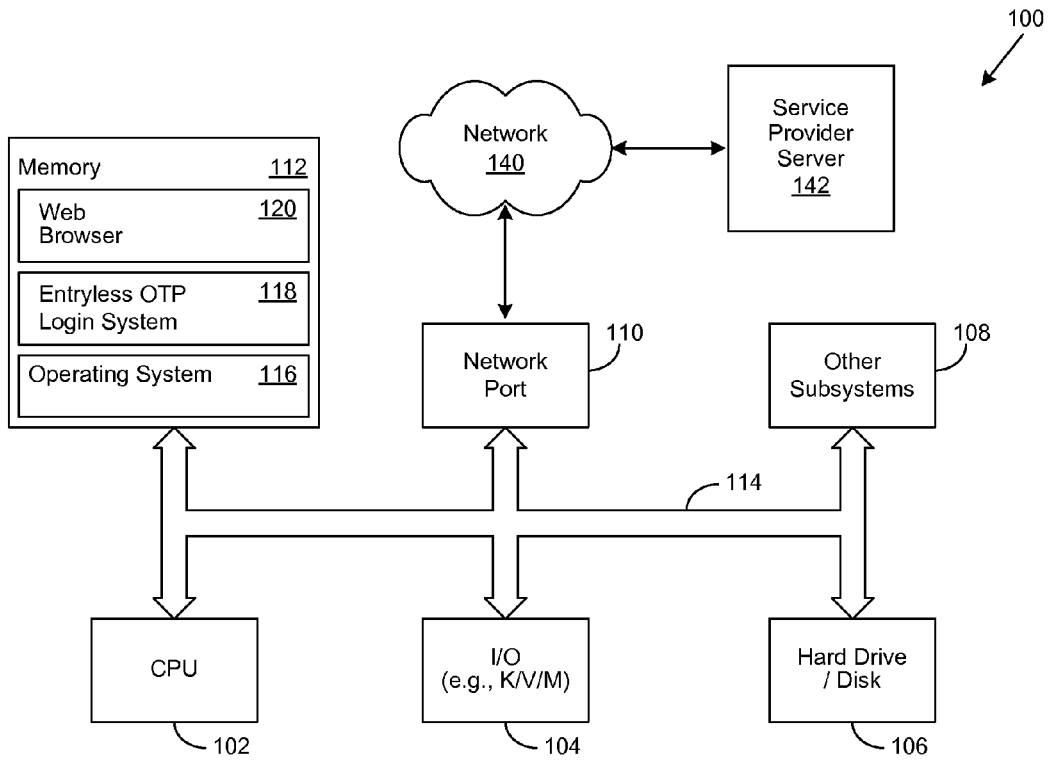
FIG. 1 is a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise an entryless One-Time password (OTP) login system 118 and a web browser 120. In one embodiment, the information handling system 100 is able to download the digital asset entitlement system 118 from the service provider server 142. In another embodiment, the digitals asset entitlement system 118 is provided as a service from the service provider server 142.

Figure 2:
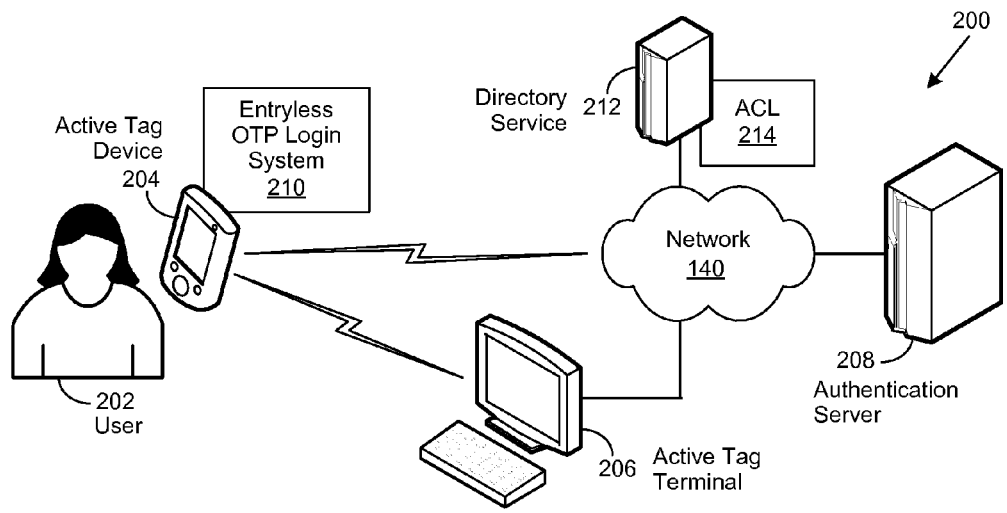
FIG. 2 is a simplified block diagram of an entryless One-Time Password (OTP) login system implemented in an active tag environment.

FIG. 2 is a simplified block diagram of an entryless One-Time Password (OTP) login system implemented in accordance with an embodiment of the invention in an active tag environment. In this embodiment, the active tag environment 200 depicted in FIG. 2 includes an active tag device 204, an active tag terminal 206, an authentication server 208, and a directory service 212, such as Active Directory, provided by Microsoft® Corporation of Redmond, Wash. In various embodiments, the directory service 212 is configured to manage an Access Control List (ACL) 214, which in certain embodiments is implemented to store an OTP credential associated with the user 202.

As used herein, an active tag device 204 broadly refers to any device that uses an active tag to communicate identification data via radio frequency (RF) transmission to another device, such as an active tag reader. Active tags typically use an internal battery to power themselves and are capable of performing various read/write operations. In general, active tags are capable of transmitting identification data over longer distances than passive tags. One example of an active tag is a Radio Frequency Identifier (RFID). In various embodiments, the active tag may be implemented in conjunction with an active tag device 204, such as a smartphone, a personal digital assistant (PDA), a tablet computer, or a laptop computer. Skilled practitioners of the art will recognize that many such embodiments are possible and the foregoing is not intended to limit the spirit, scope or intent of the invention.

As likewise used herein, an active tag terminal 206 broadly refers to any device (e.g., a computer, a payment terminal, etc.) capable of receiving identification data from an active tag. In various embodiments, the active tag terminal 206 includes an active tag reader. In certain embodiments, Near Field Communications (NFC) technologies familiar to those of skill in the art are used to communicate identification data between an active tag associated with the active tag device 204 and the active tag terminal 206. In various embodiments, other wireless connectivity (e.g., WiFi, Bluetooth, etc.) and wired connectivity (e.g., USB, etc.) technologies are used to communicate identification data between an active tag within the active tag device 204 and the active tag terminal 206.

Referring now to FIG. 2, entryless OTP login operations are initiated by a user 202 being authenticated to the active tag device 204. In various embodiments, the user is authenticated to the active tag device 204 through the use of one or more authentication factors, such as a password or a biometric identifier. These one or more authentication factors are in turn processed to generate authentication credentials for the user 204. In certain embodiments, the active tag device 204 includes an entryless OTP login system 210. In these and other embodiments, the active tag device 204 receives the authentication factors from the user. In turn, the entryless OTP login system 210 uses the authentication factors to generate the authentication credentials for the user. In various embodiments, the entryless OTP login system 210 is used to generate authentication credentials to authenticate the active tag device 204 and itself to the authentication server 208.

Once the various authentication credentials have been generated, they are submitted by the active tag device 204, along with an access request, to the authentication server 208. The authentication server 208 then verifies the provided authentication credentials, and once they are authenticated, processes the authentication credentials and access request to generate an OTP credential for the user 202. The resulting OTP credential is then sent to the directory service 212. In certain embodiments, the OTP is stored in an ACL 214 managed by the directory service 212.

Encryption operations familiar to those of skill in the art are then performed on the OTP credential by the authentication server to generate an encrypted OTP credential. In various embodiments, the OTP credential, the active tag device's 204 hardware identifier, or its Globally Unique Identifier (GUID), may be used to generate the encrypted OTP credential. In certain embodiments, the Username of the user 202, the time, the date, or the application version of the entryless OTP login system 210 may likewise be used to generate the encrypted OTP credential. In various embodiments, the system name, a Quick Fix Engineering (QFE) update, one or more measurements of system components, or a BIOS version associated with the active tag device 204 may likewise be used to generate the encrypted OTP credential. As used herein, a QFE refers to a single, cumulative package that includes information, often in the form of one or more files, that is used to address a problem in a software product. Such QFEs typically identify which fixes were installed on a device. It will be appreciated that the use of a QFE provides further assurance that an OTP credential is only consumable by the targeted active tag device 204, which has the same software configuration, thereby mitigating the possibility of replay attacks. In certain embodiments, the resulting encrypted OTP credential is in the form of a digital certificate. Skilled practitioners of the art will recognize that many such embodiments, or combinations thereof, are possible and that the foregoing is not intended to limit the spirit, scope or intent of the invention.

The resulting encrypted OTP credential is then provided to the active tag device. In various embodiments, the active tag device 204, the active tag terminal 206, the authentication server 208, and the directory service 212 are communicatively coupled by a network 140. In these and other embodiments, the network 140 may be a public network, such as the Internet, a physical private network, a virtual private network (VPN), a public or private wireless network, or any combination thereof. In these various embodiments, the network 140 is used by the active tag device 204 to submit the authentication credentials and the access request to the authentication server 208. In certain embodiments, the authentication server 208 uses the network 140 to provide the OTP credential to the directory service 212 and the encrypted OTP credential to the active tag device 204.

Once the active tag device 204 receives the encrypted OTP credential, a determination is made whether a timeout condition familiar to those of skill in the art has occurred. The method of determining whether a timeout condition has occurred, and the associated duration of a timeout interval, is a matter of design choice. If a timeout condition has occurred, then an error condition is generated and entryless OTP login operations are ended. Otherwise, operations are performed by the active tag device 204 to verify the validity of the encrypted OTP credential provided by the authentication server 208. In certain embodiments, the encrypted OTP credential is digitally signed by the authentication server 208. In these embodiments, the validity of the encrypted OTP credential is verified by performing digital signature operations familiar to skilled practitioners of the art. In certain embodiments, the digital signature operations are performed by the entryless OTP login system 210. If it is determined that the encrypted OTP credential is not valid, then entryless OTP login operations are ended. Otherwise, cryptographic operations familiar to skilled practitioners of the art are used by the entryless OTP login system to further encrypt the OTP credential with a public key. In certain embodiments, the public key is associated with the active tag terminal 206.

The resulting further encrypted OTP credential is then provided by the active tag device 204 to the active tag terminal 206. In one embodiment, the further encrypted OTP credential is provided to the active tag terminal 206 in a Near Field Communication (NFC) Data Exchange Format (NDEF). In turn, the active tag terminal 206 receives the NDEF containing the further encrypted OTP credential. The NDEF, including the session timer, is then verified by the active tag terminal 206 and a determination is made whether the NDEF is good. If so, the active tag terminal 206 requests that the authentication server 208 verify the validity of the further encrypted OTP credential. In response, the authentication server 208 accesses the directory service 212 and performs verification operations to verify the validity of the further encrypted OTP credential.

The authentication server 208 then returns the results of the verification operations to the active tag terminal 206, followed by destroying the OTP credential stored in the directory service 212. The method by which the OTP credential is destroyed is a matter of design choice. A determination is then made by the active tag terminal 206 whether the OTP credential is valid. If not, or if it was determined that the NDEF was not good, then clean-up operations are performed by the active tag terminal 206 by deleting any session keys, NDEFs, credentials, etc. that were used in the preceding operations and entryless OTP operations are ended.

However, if it was determined that the OTP credential is valid, then clean-up operations are performed by the active tag terminal 206 by deleting any session keys, NDEFs, credentials, etc. that were used in the preceding operations. The OTP credential is then decrypted and subsequently used to login the user 202 to the active tag terminal 206. Thereafter, the OTP credential is permanently deleted from the active tag device 204. The method by which the OTP is permanently deleted is a matter of design choice. It will be appreciated that the permanent deletion of the OTP credential from the active tag device 204 and the authentication server 208 reduces the possibility of replay and time-of-use attacks. In various embodiments, the reduction of this possibility is realized by ensuring that authentication of the user 202 only occurs within the period of time that the user 202 has initiated the access procedure and the time the active tag terminal 206 is accessed. Additionally, the OTP credential would be created dynamically each time the user 202 attempted to access the active tag terminal 206. Thus there is no requirement for an algorithm to be generated and used for creation, which if used, could create an opportunity for the OTP credential to cracked and compromised.

Figure 3:
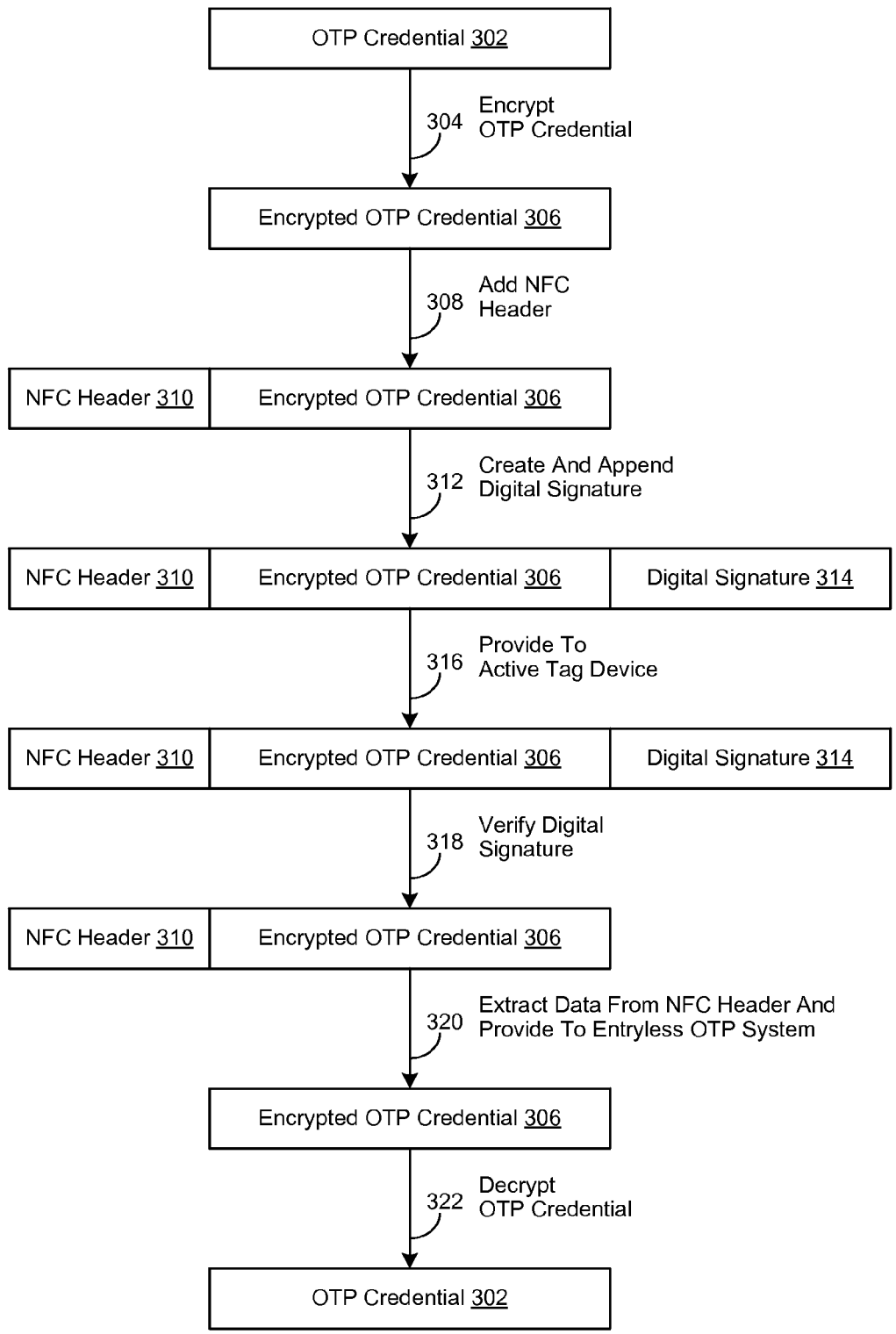
FIG. 3 is a simplified block diagram of an OTP credential implemented in an active tag environment.

FIG. 3 is a simplified block diagram of a One-Time Password (OTP) credential implemented in an active tag environment in accordance with an embodiment of the invention. In this embodiment, an OTP credential 302 is generated by an authentication server in response to receiving an access request submitted by an active tag device. Once it is generated, the OTP credential 302 is processed by the authentication server, which performs encryption operations familiar to those of skill in the art in operation 304 to generate an encrypted OTP credential 306. The method by which the encryption operations are used to generate the encrypted OTP credential 306 is a design choice.

The authentication server then adds a Near Field Communications (NFC) header 310 familiar to those of skill in the art to the encrypted OTP credential 306 in operation 308. In various embodiments, the NFC header 310 contains data associated with the active tag device 204. Once the NFC header 310 has been added to the encrypted OTP credential 306, the authentication server creates and appends a digital signature 314 to the combined NFC header 310 and encrypted OTP credential 306 in operation 312. The method used to create and append the digital signature is a matter of design choice. The combined NFC header 310, encrypted OTP credential 306, and digital signature 314 are then provided to the active tag device by the authentication server in operation 316.

In turn, the active tag device receives the combined NFC header 310, encrypted OTP credential 306, and digital signature 314 and then verifies the digital signature 314 in operation 318 by performing digital signature operations familiar to skilled practitioners of the art. In various embodiments, the active tag device includes an entryless OTP system, described in greater detail herein, which in certain embodiments performs the digital signature operations. The method used to perform the digital signature operations is a matter of design choice.

Once the digital signature has been verified, data is extracted from the NFC header 310 and provided to the afore-mentioned entryless OTP system in operation 320. Thereafter, decryption operations familiar to those of skill in the art are performed on the encrypted OTP credential 306 in operation 322 to extract the OTP credential 302 originally generated by the authentication server. In various embodiments, the decryption operations are performed by the entryless OTP system. The method used to perform the decryption operations is a matter of design choice.

Figure 4A:
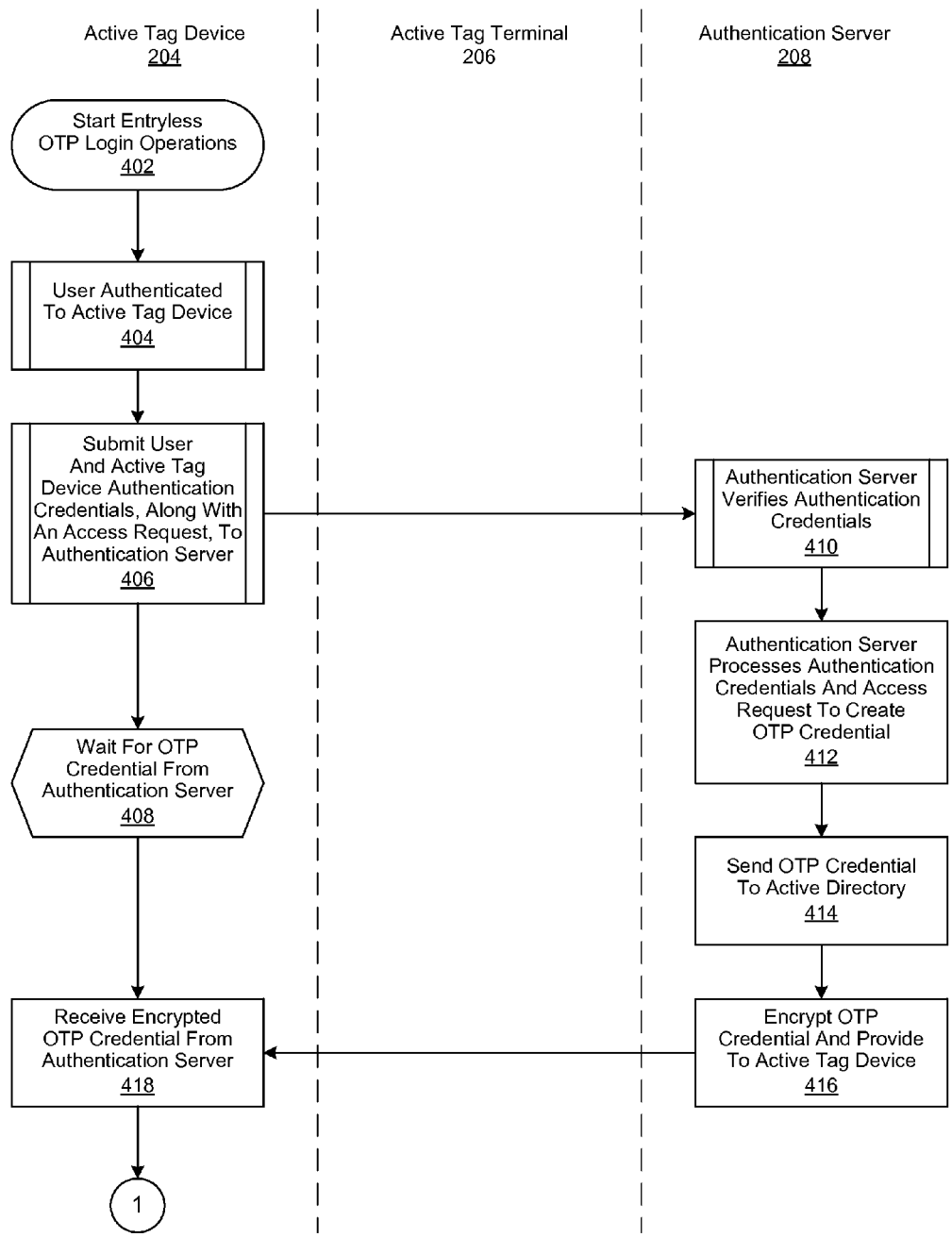
FIGS. 4a through 4c are a simplified flowchart of entryless OTP login operations implemented in an active tag environment.
Figure 4B:
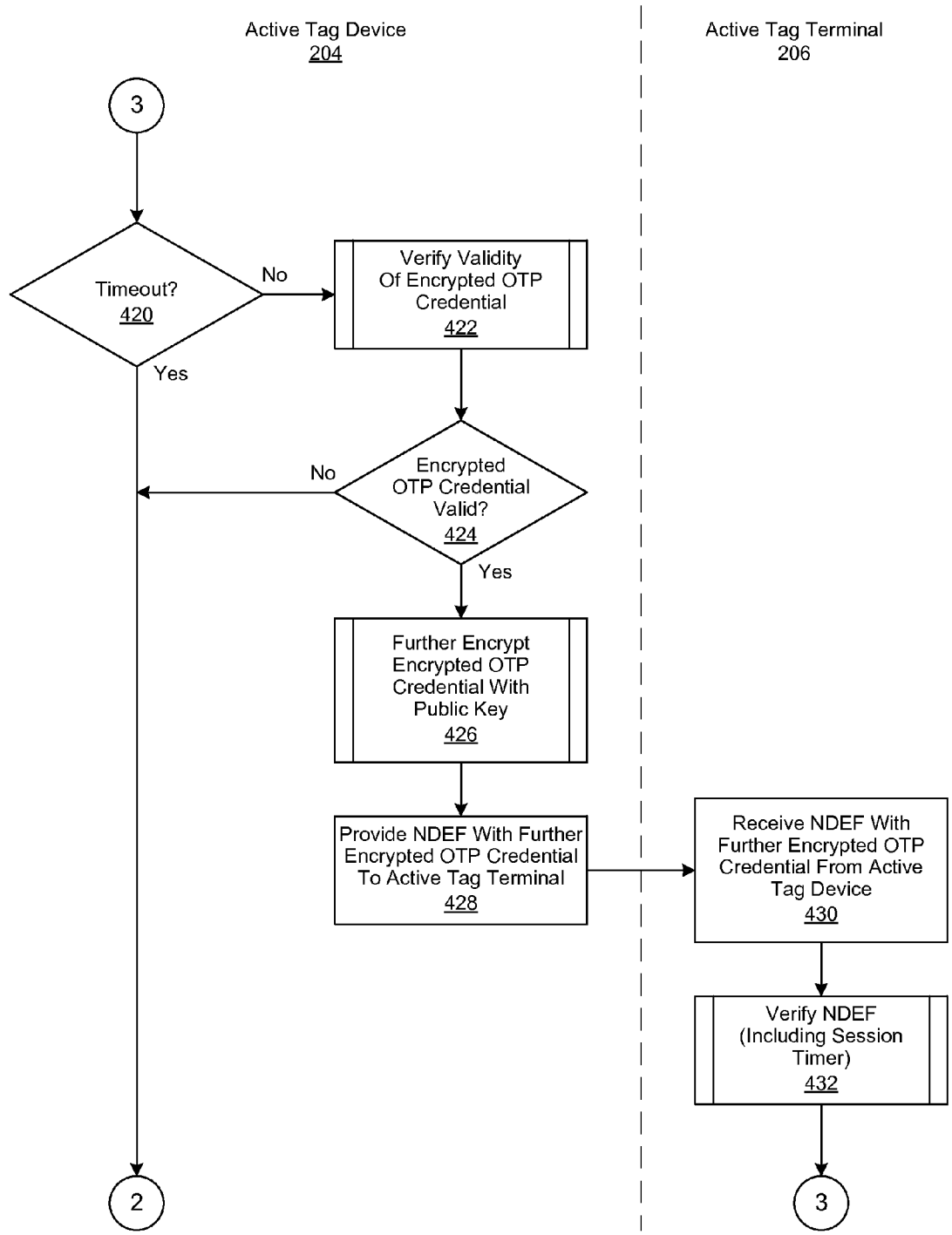
Figure 4C:
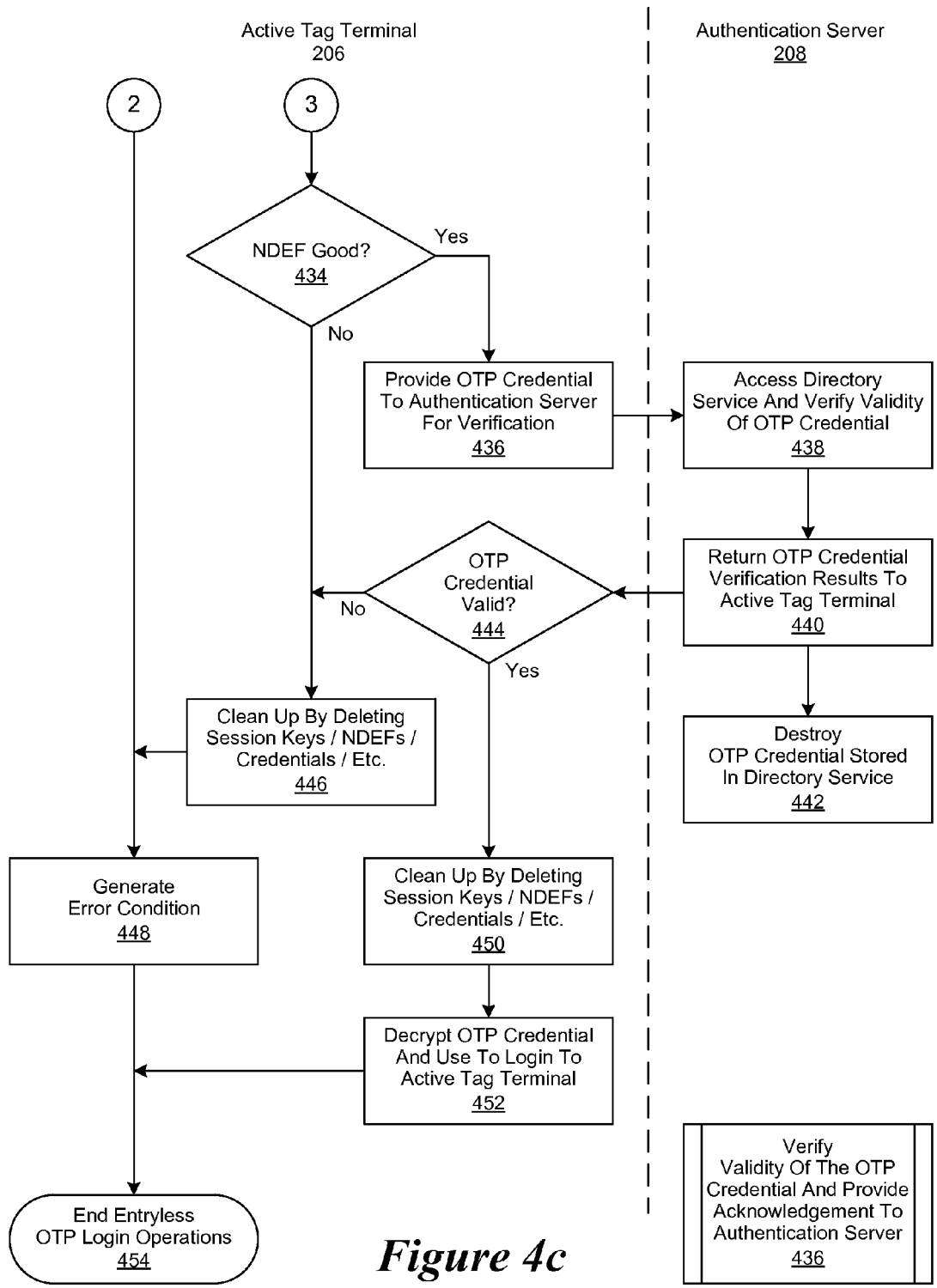

FIGS. 4a through 4c are a simplified flowchart of entryless One-Time Password (OTP) login operations implemented in accordance with an embodiment of the invention in an active tag environment. In this embodiment, the operations shown in FIGS. 4a through 4c are performed in an active tag environment that includes an active tag device 204, an active tag terminal 206, and an authentication server 208, all of which are described in greater detail herein. Referring now to FIG. 4a, entryless OTP login operations are begun in step 402, followed by a user being authenticated to the active tag device 204 in step 404. The active tag device 204 then submits user and active tag device 204 authentication credentials, along with an access request, to the authentication server 208 in step 406, followed by ongoing operations in step 408 to wait for an OTP credential from the authentication server 208.

Concurrently, the authentication server 208 verifies the provided authentication credentials in step 410, and once they are verified, processes the authentication credentials and the access request to generate an OTP credential in step 412. Once it is generated, the OTP credential is sent to a directory service 212 in step 414. The OTP credential is then encrypted, as described in greater detail herein, and provided to the active tag device 204 in step 416. The ongoing operations being performed in step 408 to wait for an OTP credential are ended and the active tag device 204 receives the OTP credential in step 418.

A determination is then made in step 420 whether a timeout condition familiar to those of skill in the art has occurred. If it was determined in step 420 that a timeout condition has occurred, then an error condition is generated in step 448 and entryless OTP login operations are ended in step 454. However, if it was determined in step 420 that a timeout condition has not occurred, then operations are performed by the active tag device 204 in step 422 to verify the validity of the encrypted OTP credential provided by the authentication server 208. A determination is then made in step 424 whether the encrypted OTP credential is valid. If not, then the process is continued, proceeding with step 448. Otherwise, cryptographic operations familiar to skilled practitioners of the art are used in step 426 to further encrypt the OTP credential with a public key. In certain embodiments, the public key is associated with the active tag terminal 206.

The resulting further encrypted OTP credential is then provided in step 428 to the active tag terminal 206 in a Near Field Communication (NFC) Data Exchange Format (NDEF). In turn, the active tag terminal 206 receives the NDEF containing the further encrypted OTP credential in step 430. The NDEF, including the session timer, is then verified by the active tag terminal 206 in step 432. A determination is then made in step 434 to determine whether the NDEF is good. If so, the active tag terminal 206 requests that the authentication server 208 verify the validity of the further OTP credential in step 436. In response, the authentication server 208 accesses the afore-mentioned directory service and performs verification operations in step 438 to verify the validity of the OTP credential. The authentication server 208 then returns the results of the verification operations to the active tag terminal 206 in step 440, followed by destroying the OTP credential stored in the directory service in step 442.

A determination is then made in in step 444 whether the OTP credential is valid. If not, or if it was determined in step 434 that the NDEF was not good, then clean-up operations are performed in step 446 by the active tag terminal 206 by deleting any session keys, NDEFs, credentials, etc. that were used in the preceding operations. The process is then continued, proceeding with step 448. However, if it was determined in step 444 that the OTP credential is valid, then clean-up operations are performed in step 450 by the active tag terminal 206 by deleting any session keys, NDEFs, credentials, etc. that were used in the preceding operations. The OTP credential is then decrypted in step 452 and subsequently used to login the user to the active tag terminal 206. Entryless OTP login operations are then ended in step 454.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A computer-implementable method for using an entryless One-Time Password (OTP) in an active tag environment, comprising:

receiving authentication credentials and access request data from an active tag device;

processing the authentication credentials and the access request data to generate an OTP credential;

storing a copy of the OTP credential in an Access Control List (ACL) managed by a directory service;

performing encryption operations to encrypt the OTP credential;

providing the encrypted OTP credential to the active tag device;

receiving a copy of the encrypted OTP credential and verification request data from an active tag terminal in response to the active tag terminal receiving the encrypted OTP credential from the active tag device;

processing the copy of the encrypted OTP credential and the verification request data by accessing the directory service and verifying validity of the encrypted OTP credential using the directory service, and generating encrypted OTP credential validation data; and providing the encrypted OTP credential validation data to the active tag terminal.

2. The method of claim 1, wherein the active tag terminal:
processes the encrypted OTP credential validation data and the encrypted OTP credential to decrypt the OTP credential from the encrypted OTP credential; and
uses the decrypted OTP credential to perform login operations to login a user of the active tag device.

3. The method of claim 2, wherein the authentication credentials comprise:
a first subset of authentication credentials associated with the user of the active tag device; and
a second subset of authentication credentials associated with the active tag device.

4. The method of claim 3, further comprising:
appending a Near Field Communication (NFC) header to the encrypted OTP credential, the NFC header containing data associated with the active tag device.

5. The method of claim 3, wherein the encrypted OTP credential is generated using at least one of the set of:
the OTP credential;
a hardware identifier associated with the active tag device;
a Globally Unique Identifier (GUID) associated with the active tag device;
a system name associated with the active tag device;
a Quick Fix Engineering (QFE) update associated with the active tag device;
one or more measurements of system components associated with the active tag device;
a BIOS version associated with the active tag device;
a Username associated with the user;
a time; and
a date.

6. The method of claim 1, further comprising:
destroying the copy of the OTP credential once the encrypted OTP credential validation data has been provided to the active tag terminal.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
receiving authentication credentials and access request data from an active tag device;
processing the authentication credentials and the access request data to generate an OTP credential;
storing a copy of the OTP credential in an Access Control List (ACL) managed by a directory service;
performing encryption operations to encrypt the OTP credential;
providing the encrypted OTP credential to the active tag device;
receiving a copy of the encrypted OTP credential and verification request data from an active tag terminal in response to the active tag terminal receiving the encrypted OTP credential from the active tag device;
processing the copy of the encrypted OTP credential and the verification request data by accessing the directory service and verifying validity of the encrypted OTP credential using the directory service, and generating encrypted OTP credential validation data; and
providing the encrypted OTP credential validation data to the active tag terminal.

8. The system of claim 7, wherein the active tag terminal:
processes the encrypted OTP credential validation data and the encrypted OTP credential to decrypt the OTP credential from the encrypted OTP credential; and
uses the decrypted OTP credential to perform login operations to login a user of the active tag device.

9. The system of claim 8, wherein the authentication credentials comprise:
a first subset of authentication credentials associated with the user of the active tag device; and
a second subset of authentication credentials associated with the active tag device.

10. The system of claim 9, further comprising:
appending a Near Field Communication (NFC) header to the encrypted OTP credential, the NFC header containing data associated with the active tag device.

11. The system of claim 9, wherein the encrypted OTP credential is generated using at least one of the set of:
the OTP credential;
a hardware identifier associated with the active tag device;
a Globally Unique Identifier (GUID) associated with the active tag device;
a system name associated with the active tag device;
a Quick Fix Engineering (QFE) update associated with the active tag device;
one or more measurements of system components associated with the active tag device;
a BIOS version associated with the active tag device;
a Username associated with the user;
a time; and
a date.

12. The system of claim 7, further comprising:
destroying the copy of the OTP credential once the encrypted OTP credential validation data has been provided to the active tag terminal.

13. A non-transitory, computer-readable storage medium embodying computer program code, the computer program code comprising computer executable instructions configured for:
receiving authentication credentials and access request data from an active tag device;
processing the authentication credentials and the access request data to generate an OTP credential;
storing a copy of the OTP credential in an Access Control List (ACL) managed by a directory service;
performing encryption operations to encrypt the OTP credential;

providing the encrypted OTP credential to the active tag device;

receiving a copy of the encrypted OTP credential and verification request data from an active tag terminal in response to the active tag terminal receiving the encrypted OTP credential from the active tag device;

processing the copy of the encrypted OTP credential and the verification request data by accessing the directory service and verifying validity of the encrypted OTP credential using the directory service, and generating encrypted OTP credential validation data; and providing the encrypted OTP credential validation data to the active tag terminal.

14. The non-transitory, computer-readable storage medium of claim 13, wherein the active tag terminal:

processes the encrypted OTP credential validation data and the encrypted OTP credential to decrypt the OTP credential from the encrypted OTP credential; and uses the decrypted OTP credential to perform login operations to login a user of the active tag device.

15. The non-transitory, computer-readable storage medium of claim 14, wherein the authentication credentials comprise:

a first subset of authentication credentials associated with the user of the active tag device; and a second subset of authentication credentials associated with the active tag device.

16. The non-transitory, computer-readable storage medium of claim 15, further comprising:

appending a Near Field Communication (NFC) header to the encrypted OTP credential, the NFC header containing data associated with the active tag device.

17. The non-transitory, computer-readable storage medium of claim 15, wherein the encrypted OTP credential is generated using at least one of the set of:

the OTP credential;

a hardware identifier associated with the active tag device;

a Globally Unique Identifier (GUID) associated with the active tag device;

a system name associated with the active tag device;

a Quick Fix Engineering (QFE) update associated with the active tag device;

one or more measurements of system components associated with the active tag device;

a BIOS version associated with the active tag device;

a Username associated with the user;

a time; and a date.

18. The non-transitory, computer-readable storage medium of claim 13, further comprising:

destroying the copy of the OTP credential once the encrypted OTP credential validation data has been provided to the active tag terminal.

* * * * *